Patented May 26, 1936

2,042,063

UNITED STATES PATENT OFFICE 2,042,063

RUBBER CEMENT

Robert J. King and Elizabeth C. King, Stamford, Conn., assignors to The Robert J. King Company, Inc., Stamford, Conn., a corporation of Connecticut No Drawing. Application July 25, 1934, Serial No. 736,906

19 Claims. (Cl. 134—17)

This invention relates to improvements in adhesive cement and more particularly rubber cement containing rubber in an organic solvent.

Rubber cements are largely used in industry for coating fabrics by a "spreading" process, followed by drying and vulcanizing; and also for the manufacture of rubber articles by repeated dipping of molds or forms in the cement, following by drying of each mold separately and vulcanizing the whole.

The satisfactory use of such cement, in manufacturing methods, requires that the rubber cement shall have a viscosity no greater than will permit the cement, when applied to fabrics, to spread evenly and penetrate the fabric properly, or, when used for dipping, to cling smoothly and evenly to the mold or form.

In such rubber cement, petroleum naphtha is, on account of its relatively low cost, the solvent principally used. None of the solvent is usually recovered. In order to increase the amount of rubber in a given amount of solvent, and still obtain the desired viscosity and working qualities of the cement, it has been the practice for many years to resort to such expedients as the pre-mastication of the rubber, the addition of acetone or certain alcohols, etc.

Pre-mastication of the rubber, before use in making rubber cement, is objectionable, both because of the expense of labor, power, etc. involved, and because the mechanical working of the rubber injures its physical properties. The use of acetone, alcohol, etc. to reduce the viscosity of cement, is objectionable because these substances are not particularly effective for the purpose, and, when used in sufficient quantities to produce any considerable effect on the viscosity, have a tendency to make the cement grainy and non-homogeneous. Larger quantities will cause the rubber to precipitate out of the cement. An increased amount of solvent can be used with increased amounts of rubber, to prevent the cement from becoming too viscous, but the use of increased amounts of solvent does not in itself increase the percentage of rubber in the cement, and involves the loss of the increased amount of solvent during the drying and vulcanizing operation.

The present invention provides an improved method and composition whereby the objections to the usual methods, above referred to, are largely overcome or obviated, whereby pre-mastication of the rubber can be greatly reduced or eliminated entirely, whereby the amount of solvent required to make a cement of a given viscosity is materially reduced, whereby more rubber can be put into a given amount of solvent without increasing its viscosity, whereby the time required for churning and making of the cement can be materially reduced, whereby a smooth homogeneous cement can be readily produced, and whereby an improved cement can be produced at a materially lower cost. Among the other advantages which the invention presents is a further saving made possible in dipping and spreading articles or fabrics with the cement, in that a lesser number of dips, or fewer spreader coats, are necessary than with cements heretofore made and used, and containing a lesser amount of rubber in cements of proper working viscosity.

According to the present invention, there is incorporated in the rubber before churning and making the cement therefrom, or there is added to the solvent in the cement churn before making the cement, a small amount of a sulfonated hydrocarbon product, and particularly a small amount of a sulfonated petroleum product made by the treatment of petroleum oils with sulfuric acid, as described in one form in German Patents Nos. 271,433 and 264,785, and in U. S. Patent No. 1,703,838, and which sulfonated petroleum products are known to the chemical trade under the trade name "Kontakt" and also under the trade name "Sulpho A". Such sulfonated petroleum products are oil-soluble and have a remarkable effect in facilitating the preparation of smooth homogeneous cement with a minimum of churning time and solvents.

Instead of using the sulfonated petroleum oil alone, it is advantageously used in conjunction with an alcohol, for example, in the proportions of about 75% of the sulfonated petroleum products such as Sulpho A, and about 25% of normal butyl alcohol. The use of normal butyl alcohol in conjunction with the Sulpho A increases the effectiveness of the composition, as compared with the use of the Sulpho A alone, and has other practical advantages, such as greater fluidity which facilitates packaging, handling and measuring of the composition, and lower cost.

Instead of using normal butyl alcohol with the sulfonated petroleum oil, other alcohols can be used, such as hexyl alcohol, ethyl alcohol, amyl alcohol, cyclohexanol, etc. The normal butyl alcohol, however, is particularly advantageous for use with sulfonated petroleum oils, such as Sulpho A.

Instead of using sulfonated petroleum oils, other sulfonated hydrocarbons can be used, for example, benzene sulfonic acid, but this substance has the objection that it is only slightly soluble in naphtha and its solubility is affected by the presence of varying amounts of water and other material. Because of these and other objections, the sulfonated aromatic hydrocarbons are less advantageous; and the sulfonated hydrocarbons which have been found particularly advantageous are those derived from petroleum, as above pointed out. When the sulfonated petroleum product is used, it is desirable to neutralize any free sulfuric acid that it may contain, by the addition of caustic soda solution, followed by thorough settling and removal of sodium sulfate and other impurities.

The proportions of the sulfonated petroleum oil and of the admixed alcohol can be varied. For example, in the case of Sulpho A and normal butyl alcohol, the proportion of the alcohol can be varied from a minimum amount up to around 30% of the total mixture, i. e. up to around 30% normal butyl alcohol and 70% Sulpho A. A mixture containing about 75% Sulpho A and 25% normal butyl alcohol has been found a valuable proportion for commercial use.

The present invention includes such a new composition, namely, a composition comprising a sulfonated hydrocarbon and an alcohol, such as Sulpho A and normal butyl alcohol, which can be readily marketed, shipped and stored, and which is convenient for use in measured amounts as a concentrated material, of which only a very small amount is required for addition to the rubber or the solvent in making rubber cement. Only a fraction of 1% of the composition, based on the solvent, is usually required, for example, from 0.1 to 0.3%, based on the solvent; although higher amounts, up to 1% or more, can be used, particularly with cement containing an unusually high content of rubber.

It is customary, in making rubber cement, to pre-masticate the rubber, not only to increase the amount which can be dissolved in the solvent, but for purposes of compounding, where other ingredients such as sulfur, accelerators, metal oxides, etc. are to be incorporated in the cement. Where the rubber is to be thus pre-masticated, before making the cement from it, it is advantageous to add the activating materials, e. g. the mixture of Sulpho A and normal butyl alcohol, to the rubber before the mastication, since the breaking down and mastication can thereby be very radically reduced in time and power required. It is however, one advantage of the invention that it enables the amount of pre-mastication to be greatly reduced, or eliminated entirely, since the use of the solvent activators enables even unmilled rubber to be readily compounded with the solvent for cement manufacture.

The invention will be further illustrated by the following specific examples:

A series of cements were made with 8 ounces of rubber per gallon of solvent, using V. M. & P. (Varnish Makers and Painters) naphtha, and using pre-masticated rubber such as is commonly used for cement manufacture. The cement made with the rubber and solvent and without the addition of the sulfonic acid or sulfonated oil showed a viscosity, as determined by the Mac-Michael viscosimeter, of 95.00 poises. A cement of the same rubber content and with the same solvent, i. e. 8 ounces of rubber per gallon of naphtha, and also containing Sulpho A in the proportion of 1 gram of Sulpho A per 1000 cc. of solvent, showed a viscosity, when tested by the MacMichael viscosimeter, of 36.50 poises. A similar cement, made with benzene sulfonic acid in the proportions of 1 gram per 1000 cc. of solvent showed a viscosity of 25.80 poises. While this result, in the case of benzene sulfonic acid, would indicate that it is more effective than Sulpho A, its practical use is limited by the fact that it is only slightly soluble in naphtha, and its solubility is affected by the presence of varying amounts of water and other materials, and it is also poisonous.

A similar series of tests were made of 8 ounce cements, made of pre-masticated rubber such as is commonly used in cement manufacture, and comparing the viscosity of the cement containing no solvent activator with the cement containing a solvent activator made up of a mixture of Sulpho A and different alcohols. In each case the cement contained 8 ounces of rubber per gallon of V. M. & P. naphtha, and the amount of activator used was in the proportion of 1 gram of the solvent activator per 1000 cc. of solvent. The following viscosities were obtained:

| Solvent activator | Viscosity of cement |
|---|---|
| | Poises |
| None | 95.00 |
| 75% Sulpho A and 25% normal butyl alcohol | 36.50 |
| 75% Sulpho A and 25% secondary hexyl alcohol | 58.80 |
| 75% Sulpho A and 25% ethyl alcohol | 66.00 |
| 75% Sulpho A and 25% amyl alcohol | 1.80 |
| 75% Sulpho A and 25% cyclohexanol alcohol | 54.30 |

This tabulation shows that the normal butyl alcohol is more advantageous for use with the Sulpho A, in the proportions given above, than the other alcohols; and that the viscosity of the cement (36.50 poises) is comparable with the viscosity of the cement made with Sulpho A alone in similar proportion to the proportion of Sulpho A and normal butyl alcohol of the above tabulation, namely, in the proportion of 1 gram per 1000 cc. of solvent.

A convenient way of testing the different activators, with results comparable to those obtained in actual practice, is by the use of a glass jar or container, having a stirrer in it, and an air-tight cover, in which the ingredients for making the cement are inserted, and the contents stirred, either by rotation of the stirrer, or by rotation of the container while keeping the stirrer stationary, until a homogeneous cement is obtained, which can then be tested in the MacMichael viscosimeter, and the viscosity determined.

The effect of different amounts of the solvent activator will be illustrated by the following tabulation of viscosities. In all of the tests tabulated below, the cements contained 8 ounces of rubber per gallon of V. M. & P. naphtha and the 75—25 mix referred to in the tabulation, was a mixture made up of 75% Sulpho A and 25% normal butyl alcohol. The cements after being made, had their viscosities determined by the MacMichael viscosimeter. The rubber used was pre-masticated rubber of the kind commonly used for cement manufacture and the first figures in the following tabulation show the results of the cement made without the addition of any activator, from such pre-masticated rubber. The other figures show the results obtained with the addition of the amount specified, based on the solvent, of the 75—25 mix:

| Solvent activator | Percent of solvent activator to solvent | Viscosity of cement in poises |
|---|---|---|
| | *Percent* | |
| None | 0.0 | 95.00 |
| 75—25 mix | 0.05 | 53.00 |
| Do | 0.1 | 36.50 |
| Do | 0.2 | 14.00 |
| Do | 0.3 | 6.00 |

The above tabulation shows that an amount of solvent activator as little as 0.05% has a material effect in reducing the viscosity of a standard cement; while the use of somewhat larger amounts of the solvent activator results in a radical decrease in viscosity, making possible the increase in the rubber content of the cement without increasing the viscosity beyond the point which can readily be handled in commercial practice.

As already stated, it is an outstanding advantage of the present invention that it enables the pre-mastication of the rubber to be greatly shortened, or entirely eliminated. Ordinary unmilled rubber cannot be added directly to naphtha to form a satisfactory cement for spreading or dipping. A cement made with 8 ounces of unmilled rubber per gallon of V. M. & P. naphtha had a viscosity, after churning to a homogeneous state, of about 458.00 poises. Such a cement would be impractical for commercial purposes such as dipping, spreading, etc., because of its high viscosity. The addition of alcohols alone to the cement, or to the rubber and naphtha in making the cement, enables the viscosity to be somewhat reduced, but does not give results comparable with those obtained with pre-masticated rubber, and without the addition of alcohol. It was found, for example, that the addition of 2% of ethyl alcohol to an 8 ounce cement, containing 8 ounces of unmilled rubber per gallon of naphtha, gave a cement which, when tested for its viscosity, showed a viscosity of 199 poises. Using 5% of ethyl alcohol gave a cement with a viscosity of 155.00 poises.

As compared with these results, the addition of only 0.2% of the 75—25 mix of Sulpho A and normal butyl alcohol gave an 8 ounce cement with a viscosity of only 75.00 poises, which is materially less than a viscosity of 8 ounce cement made from pre-masticated rubber and without the addition of any activator thereto. Compared with the action of ethyl alcohol alone on the 8 ounce cement, it is evident that the use of only 1/25th as much of the 75—25 mix gave a radically lower viscosity of the cement than the use of the ethyl alcohol. 5% of ethyl alcohol gave a cement with a viscosity far higher than that of cement made with pre-masticated rubber and without any addition; while the addition of only 0.2% of the 75—25 mix gave a cement with a much lower viscosity than that obtained from pre-masticated rubber.

The advantages of the new cement compositions, indicated by the above tables of viscosities, are reflected in the actual use of the cement for coating or dipping, enabling cement to be produced of the desired viscosity but with increased rubber content, and with a substantial saving of solvent required for making the cement of normal viscosity.

A further advantage of the present invention lies in the reduction which it makes possible in the amount of churning necessary to produce a smooth homogeneous cement from given quantities of naphtha and rubber. Examples of such savings in churning time, with reductions in viscosity at the same time, are given in the following table, which shows cements made with thoroughly pre-masticated rubber, without the addition of any solvent activator, and with the addition of the amount indicated of the 75—25 mix above referred to, made up of 75% Sulpho A and 25% normal butyl alcohol. The solvent used was V. M. & P. naphtha, and the rubber content of the different cements is that indicated in the table. The cements were made in the usual way by adding the ingredients to a churn, and churning:

*Rubber per gallon of solvent*

| Amount of 75—25 mix in the solvent | 4 ounces | | 8 ounces | | 16 ounces | |
|---|---|---|---|---|---|---|
| | Viscosity in poises | Hours' churning | Viscosity in poises | Hours' churning | Viscosity in poises | Hours' churning |
| None | 2.46 | 19 | 16.80 | 16 | 410.00 | 14 |
| 0.1% | 1.76 | 13 | 13.60 | 11 | 348.50 | 10 |
| 0.2% | 1.06 | 10 | 10.64 | 8 | 287.00 | 7 |

From this table it is evident that the addition of only a small fraction of 1% of the solvent activator not only reduces the time required for churning and making the cement, but also gives a cement of materially reduced viscosity; and makes possible the increase in the rubber content, and the decrease of the solvent required, for a cement of a given viscosity, such as that commonly used for coating and dipping purposes.

In the commercial manufacture of rubber cement, it is customary to add the rubber and solvent to a churn, and churn the ingredients until a homogeneous cement is obtained. The solvent activators of the present invention are advantageously added to the churn, or to the rubber before adding it to the churn, or to the solvent before adding it to the churn. It is common to make many different types and kinds of cements, both for coating and dipping purposes; and the present invention is of more or less general application to such cements, and to the improvement of their properties, along the lines above referred to. The cements may, for example, be pure rubber cements, containing only the rubber and solvent and the solvent activator; or they may be compounding cements of various kinds which contain sulfur or other vulcanizing agents, as well as metal oxides or other compounding ingredients, accelerators, etc.

There are advantages, in some cases, in incorporating the solvent activator in the rubber, by adding it to the rubber on a roll mill while preparing the rubber to receive the usual compounding ingredients, and before adding the compounded rubber to the churn. The use of the solvent activator enables a radical reduction to be secured in the time and power required for pre-masticating the rubber and the incorporating of the compounding ingredients therewith; and the resulting compounded rubber, when added to the churn with the solvent, has the advantages in the production of the cement, and in the resulting cement compositions, such as those above referred to.

As compared with ordinary pre-masticated rubber, the rubber pre-masticated with the addition of the activator before or at the beginning of mastication, not only radically shortens the time and reduces the power required, but also avoids or minimizes injury to the physical properties of the rubber. It enables the rubber to be readily compounded, and, when the compounded rubber is then added to the churn with the solvent, the churning operation and the manufacture of the cement are facilitated, as already described.

We claim:

1. The method of reducing the churning time required for the manufacture of non-aqueous rubber cement from ingredients including rubber and organic solvents, and simultaneously producing a cement of low viscosity, which comprises adding to the churn, in addition to the ingredients, such as rubber and organic solvent, from which the cement is to be made, a small amount of a sulfonated hydrocarbon as an activator.

2. The method of reducing the churning time required for the manufacture of non-aqueous rubber cement from ingredients including rubber and organic solvents, and simultaneously producing a cement of low viscosity, which comprises adding to the churn, in addition to the ingredients, such as rubber and organic solvent, from which the cement is to be made, a small amount of a sulfonated mineral oil as an activator.

3. The method of reducing the churning time required for the manufacture of non-aqueous rubber cement from ingredients including rubber and organic solvents, and simultaneously producing a cement of low viscosity, which comprises adding to the churn, in addition to the ingredients, such as rubber and organic solvent, from which the cement is to be made, a small amount of a composition made up mainly of sulfonated mineral oil with a lesser amount of an alcohol.

4. The method of reducing the churning time required for the manufacture of non-aqueous rubber cement from ingredients including rubber and organic solvents, and simultaneously producing a cement of low viscosity, which comprises adding to the churn, in addition to the ingredients, such as rubber and organic solvent, from which the cement is to be made, a small amount of a composition made up mainly of sulfonated mineral oil with a lesser amount of normal butyl alcohol.

5. A concentrated non-aqueous composition adapted for use in rubber compounding and rubber cement manufacture as a solvent activator, said composition consisting essentially of a preponderating amount of a sulfonated mineral oil and a lesser amount of an alcohol.

6. A concentrated non-aqueous composition adapted for use in rubber compounding and rubber cement manufacture as a solvent activator, said composition consisting essentially of a preponderating amount of a sulfonated mineral oil and a lesser amount of normal butyl alcohol.

7. A concentrated non-aqueous composition adapted for use in rubber compounding and rubber cement manufacture as a solvent activator, said composition consisting essentially of about 75% of sulfonated mineral oil and about 25% of normal butyl alcohol.

8. The improvement in the manufacture of rubber adhesives containing from about 4 to about 16 ounces of rubber per gallon in solution in a volatile solvent which comprises incorporating therein a small amount of a sulfonated hydrocarbon sufficient to reduce the viscosity of the adhesive.

9. The improvement in the manufacture of rubber adhesives containing from about 4 to about 16 ounces of rubber per gallon in solution in a volatile solvent which comprises incorporating therein a small amount of a sulfonated petroleum oil sufficient to reduce the viscosity of the adhesive.

10. The improvement in the manufacture of rubber adhesives containing from about 4 to about 16 ounces of rubber per gallon in solution in a volatile solvent which comprises incorporating therein a small amount of a sulfonated petroleum product and a small amount of an alcohol sufficient to reduce the viscosity of the adhesive.

11. The improvement in the manufacture of rubber adhesives containing from about 4 to about 16 ounces of rubber per gallon in solution in a volatile solvent which comprises incorporating therein a small amount of a sulfonated mineral oil and a small amount of normal butyl alcohol sufficient to reduce the viscosity of the adhesive.

12. An improved rubber adhesive composition containing from about 4 to about 16 ounces of rubber per gallon in solution in a volatile organic solvent and a small amount of a sulfonated hydrocarbon as a solvent activator.

13. An improved rubber adhesive composition containing from about 4 to about 16 ounces of rubber per gallon in solution in a volatile organic solvent and a small amount of a sulfonated mineral oil as a solvent activator.

14. An improved rubber adhesive composition containing from about 4 to about 16 ounces of rubber per gallon in solution in a volatile organic solvent and a small amount of a sulfonated mineral oil and of an alcohol as a solvent activator.

15. An improved rubber adhesive composition containing from about 4 to about 16 ounces of rubber per gallon in solution in a volatile organic solvent, and a small amount of a sulfonated mineral oil and normal butyl alcohol.

16. An improved rubber adhesive composition containing about 8 ounces of rubber per gallon in solution in a volatile organic solvent and a small amount of a sulfonated hydrocarbon as a solvent activator.

17. An improved rubber adhesive composition containing about 8 ounces of rubber per gallon in solution in a volatile organic solvent and a small amount of a sulfonated mineral oil as a solvent activator.

18. An improved rubber adhesive composition containing about 8 ounces of rubber per gallon in solution in a volatile organic solvent and a small amount of a sulfonated mineral oil and of an alcohol as a solvent activator.

19. An improved rubber adhesive composition containing about 8 ounces of rubber per gallon in solution in a volatile organic solvent, and a small amount of a sulfonated mineral oil and normal butyl alcohol.

ROBERT J. KING.
ELIZABETH C. KING.

CERTIFICATE OF CORRECTION.

Patent No. 2,042,063.   May 26, 1936.

ROBERT J. KING.

It is hereby certified that error appears in the printed specification of the above numbered patent requiring correction as follows: Page 2, second column, next to last line of table, for "1.80" read 61.80; and that the said Letters Patent should be read with this correction therein that the same may conform to the record of the case in the Patent Office.

Signed and sealed this 21st day of July, A. D. 1936.

Henry Van Arsdale

(Seal)   Acting Commissioner of Patents.